US011029991B2

(12) United States Patent
Busaba et al.

(10) Patent No.: US 11,029,991 B2
(45) Date of Patent: Jun. 8, 2021

(54) DISPATCH OF A SECURE VIRTUAL MACHINE

(71) Applicant: INTERNATIONAL BUSINESS MACHINES CORPORATION, Armonk, NY (US)

(72) Inventors: Fadi Y. Busaba, Poughkeepsie, NY (US); Lisa Cranton Heller, Rhinebeck, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 16/296,336

(22) Filed: Mar. 8, 2019

(65) Prior Publication Data
US 2020/0285500 A1 Sep. 10, 2020

(51) Int. Cl.
G06F 9/455 (2018.01)
G06F 21/62 (2013.01)

(52) U.S. Cl.
CPC ...... *G06F 9/45558* (2013.01); *G06F 9/45533* (2013.01); *G06F 21/62* (2013.01); *G06F 21/6218* (2013.01); *G06F 2009/4557* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 7,401,230 | B2 | 7/2008 | Campbell et al. |
| 7,984,108 | B2 | 7/2011 | Landis et al. |
| 8,689,213 | B2 | 4/2014 | Philipson et al. |
| 9,009,471 | B2 | 4/2015 | Korthny et al. |
| 9,065,854 | B2 | 6/2015 | Goyal et al. |

(Continued)

FOREIGN PATENT DOCUMENTS

WO 2011149983 A2 12/2011

OTHER PUBLICATIONS

Xia et al., "Architecture Support for Guest-Transparent VM Protection from Untrusted Hypervisor and Physical Attacks", IEEE, 2013 . (Year: 2013).*
Jin et al., "Architectural Support for Secure Virtualization under a Vulnerable Hypervisor", ACM, 2011. (Year: 2011).*
Bullions et al., "Milli Code", An IP.com Prior Art Database Technical Disclosure, IP.com No. IPCOM000110171D, Publication Date: Mar. 25, 2005, 5 pages.

(Continued)

*Primary Examiner* — Qing Yuan Wu
(74) *Attorney, Agent, or Firm* — Cantor Colburn LLP; Steven Chiu

(57) ABSTRACT

According to one or more embodiments of the present invention, a computer implemented method includes receiving, by a hypervisor that is executing on a host server, a request to dispatch a virtual machine. The method further includes, based on a determination that the virtual machine is a secure virtual machine, preventing the hypervisor from directly accessing any data of the secure virtual machine by determining, by a secure interface control of the host server, a security mode of the virtual machine. Based on the security mode being a first mode, the secure interface control loads a virtual machine state from a first state descriptor, which is stored in a non-secure portion of memory. Based on the security mode being a second mode, the secure interface control loads the virtual machine state from a second state descriptor, which is stored in a secure portion of the memory.

22 Claims, 8 Drawing Sheets

(56) References Cited

U.S. PATENT DOCUMENTS

| | | | |
|---|---|---|---|
| 9,223,574 B2 | 12/2015 | Bradbury et al. | |
| 9,880,871 B2 | 1/2018 | Tsirkin et al. | |
| 10,057,069 B2 | 8/2018 | Bonzini et al. | |
| 10,129,241 B2 | 11/2018 | Ramachandran et al. | |
| 10,474,816 B2* | 11/2019 | Hall | G06F 13/364 |
| 2014/0006776 A1 | 1/2014 | Scott-Nash et al. | |
| 2014/0143372 A1 | 5/2014 | Nahrgang | |
| 2016/0132345 A1 | 5/2016 | Bacher | |
| 2018/0165224 A1 | 6/2018 | Brown | |
| 2018/0246749 A1 | 8/2018 | Van Riel et al. | |
| 2018/0247082 A1* | 8/2018 | Durham | G06F 8/63 |
| 2019/0034627 A1* | 1/2019 | Hall | G06F 21/556 |
| 2019/0042296 A1 | 2/2019 | Dewan | |
| 2019/0095350 A1* | 3/2019 | Durham | G06F 21/602 |
| 2020/0057664 A1* | 2/2020 | Durham | G06F 12/1408 |

OTHER PUBLICATIONS

International Search Report and Written Opinion for Application No. PCT/EP2020/055070; International Filing Date: Feb. 26, 2020; dated Apr. 28, 2020, 8 pages.

International Search Report; International Application No. PCT/EP2020/055311; International Filing Date: Feb. 28, 2020; dated May 25, 2020; 11 pages.

Heller et al., "Communication Interface of a Secure Interface Control," U.S. Appl. No. 16/296,460, filed Mar. 8, 2019.

List of IBM Patents or Patent Applictions Treated as Related; Appendix P; Date Filed Jun. 20, 2019; 2 Pages.

Szefer et al.; "Architectural Support for Hypervisor-Secure Virtualization"; Proceedings of the International Conference on Architectural Support for Programming Languages and Operating Systems; Mar. 3-7, 2012; pp. 1-13.

* cited by examiner

DISPATCH OF A SECURE VIRTUAL MACHINE

BACKGROUND

The present application relates to computer technology, and more specifically, to virtual machines.

Cloud computing facilitates the ability to provision a virtual machine for a customer quickly and easily, without requiring the customer to purchase hardware or provide floor space for a physical server. The customer may expand or contract the virtual machine according to changing preference(s). Typically, the cloud computing provider provisions the virtual machine, which is physically resident at the provider's datacenter. In this environment, the customer's virtual machine is running as a guest and the cloud provider uses hypervisor code running as a host to virtualize the server resources between multiple virtual machines, possibly belonging to different customers.

Customers are often concerned about the security of data in the virtual machine. Cloud operators may not be trusted and customers may want to deploy their work without the risk of being compromised by malicious or broken code (like hypervisor) and/or a system administrator with malicious intent operating the datacenter. The customer may desire security between its code and data and the cloud computing provider as well as between its code and data and from other VMs running at the provider's site and security from the provider's administrators as well as protection against potential security breaches in other code running on the machine. For example, a customer may request that cloud providers do not have access to their data, so as to reduce or avoid the possibility that the cloud computing provider, such as a United States (U.S.) company is forced, possibly through subpoena, to turn over confidential or proprietary documents.

SUMMARY

According to one or more embodiments of the present invention, a computer implemented method includes receiving, by a hypervisor that is executing on a host server, a request to dispatch a virtual machine. The method further includes based on a determination that the virtual machine is a secure virtual machine, preventing the hypervisor from directly accessing any data of the secure virtual machine. The method further includes performing by a secure interface control of the host server determining a security mode of the virtual machine. Further, based on the security mode being a first mode, the secure interface control loads a virtual machine state from a first state descriptor for the virtual machine, the first state descriptor stored in a non-secure portion of memory. Further, based on the security mode being a second mode, the secure interface control loads the virtual machine state from a second state descriptor for the virtual machine, the second state descriptor stored in a secure portion of the memory.

In one or more examples, the second state descriptor is accessible only by the secure interface control and not accessible to the hypervisor. In one or more examples, the first state descriptor includes a pointer to the second state descriptor. In one or more examples, the secure interface control determines the security mode of the virtual machine based on one or more secure interface control controls qualified with masks saved in the second state descriptor. Further, in one or more examples, the secure interface control validates the correctness of the virtual machine state by comparing values in the first state descriptor and the second state descriptor.

According to one or more embodiments of the present invention, the method further includes detecting an occurrence of an exit condition for the virtual machine, and performing, by the secure interface control, based on the security mode being the first mode, storing the virtual machine state into the first state descriptor that is stored in the non-secure portion of memory. The method further includes based on the security mode being the second mode, storing the virtual machine state into the second state descriptor that is stored in the secure portion of the memory.

According to one or more embodiments of the present invention, the method further includes, based on the security mode being a third mode, storing the virtual machine state into the second state descriptor that is stored in the secure portion of the memory, and storing one or more selected parameters from the virtual machine state into the first state descriptor that is stored in the non-secure portion of memory.

In one or more examples, the secure interface control includes millicode.

According to one or more embodiments of the present invention, a computer-implemented method includes dispatching, by a hypervisor that is executing on a host machine, a secure virtual machine, wherein the hypervisor is prevented from directly accessing any data of the secure virtual machine. The method further includes, based on occurrence of an exit condition for the secure virtual machine, performing, by a secure interface control of the host server, determining a security mode of the secure virtual machine. Further, based on the security mode being a first mode, the secure interface control stores a virtual machine state of the secure virtual machine into a first state descriptor that is stored in a non-secure portion of memory. Further yet, based on the security mode being a second mode, the secure interface control stores the virtual machine state into a second state descriptor that is stored in a secure portion of the memory that is not accessible by the hypervisor.

In one or more examples, based on the security mode being a third mode, the method includes storing the virtual machine state into the second state descriptor that is stored in the secure portion of the memory, and storing one or more selected parameters from the virtual machine state into the first state descriptor that is stored in the non-secure portion of memory. In one or more examples, the secure interface control determines the security mode of the secure virtual machine based on one or more secure interface control controls qualified with masks saved in the second state descriptor.

The above described features can also be provided at least by a system, a computer program product, and a machine.

The features described herein provide improvements to computer technology, particularly, computer servers that host virtual machines (VMs) by facilitating the computer servers to host secure VMs. In the case of secure VMs where the hypervisor is no longer trusted with control of the VM's data, dispatching the secure VM through the same hypervisors interface as in existing computer servers is still the preferred (or required in some cases) option for compatibility with existing hypervisors to continue operation. Accordingly, one or more embodiments of the present invention facilitate the hypervisor code to not have to change, so that the same code (of existing hypervisors) can be used to dispatch typical non-secure VMs as well as the secure VMs that prohibit hypervisor data access in the host computer servers.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
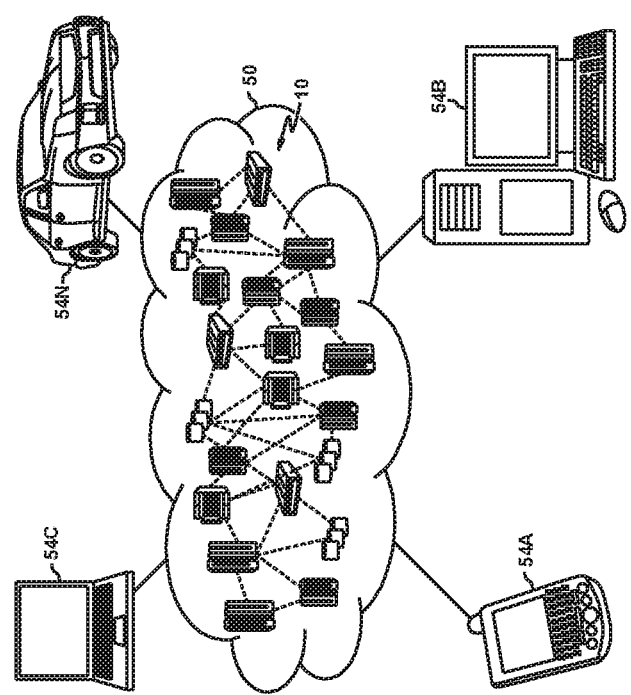
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A technical challenge regarding typical cloud environments is the potentially unsecure and unwanted access to data and algorithms (e.g., by a cloud provider or cloud administrator). The cloud provider typically runs hypervisor code as the host with the customers' VMs running as guests. This hypervisor code provides the virtualization function required to allow multiple VMs to run on a single physical machine. In existing systems, the hypervisor (and often by extension the cloud administrator) has access to customers' data and algorithms for situations where it must access limited portions of that data to provide a virtualization function. Hypervisors are often required to access guest data to interpret guest instructions, and to do I/O operations on behalf of the guest. Hypervisor access to guest memory is required for the guest functional correctness. Accordingly, one or more embodiments of the present invention provide how to dispatch a secure VM using a non-trusted hypervisor.

A virtual machine, running as a guest under the control of a host hypervisor, relies on that hypervisor to transparently provide virtualization services for that guest. These services can include, but are not limited to memory management, instruction emulation, and interruption processing. One or more embodiments of the present invention can apply to any interface between a secure entity and another untrusted entity that traditionally allows access to the secure resources by this other entity. For example, for interruption and exception emulation the hypervisor typically reads and/or writes into a prefix area (low core) of the guest. The term "virtual machine" or "VM" as used herein refers to a logical representation of a physical machine (computing device, processor, etc.) and its processing environment (operating system (OS), software resources, etc.) The virtual machine state is maintained by the hypervisor that executes on an underlying host machine (physical processor or set of processors). From the perspective of a user or software resource, the virtual machine appears to be its own independent physical machine. The terms "hypervisor" and "VM Monitor (VMM)" as used herein refer to a processing environment or platform service that manages and permits multiple VM's to execute using multiple (and sometimes different) OS's on a same host machine. It should be appreciated that dispatching a VM includes an installation process of the VM and an activation (or starting) process of the VM. In another example, dispatching a VM includes an activation (or starting) process of the VM (e.g., in case the VM is previously installed or already exists).

However, for facilitating secure guests, a technical challenge exists where the computer server, such as the hosting node, has to provide added security between the hypervisor and the secure guests, such that the hypervisor cannot access data from the VM, and hence, cannot provide services such as those above.

In presently available technical solutions, the hypervisor (e.g., z/VM® by IBM® or open source software Kernel Based Virtual machine (KVM)) dispatches a new VM virtual CPU (vCPU) on a physical processing unit, or host server, by issuing a Start-Interpretive-Execution (SIE) instruction which causes the SIE Entry millicode to be invoked. Millicode is trusted firmware that operates as an extension to the processor hardware. The operand of the SIE instruction is a control block, referred to as the state description, which contains the guest state. In existing implementations, this state description resides in hypervisor storage. During SIE Entry, this guest state (including general purpose and control registers, guest instruction-address and guest program-status-word (PSW)) is loaded by millicode into the hardware. This allows the guest vCPU to run on the physical processor. While the vCPU is running on the hardware, the guest state is maintained in the hardware. At some point, the hardware/ millicode must return control back to the hypervisor. This is often referred to as SIE Exit. This may be required, for example, if this vCPU executes an instruction which requires emulation by the hypervisor or if the vCPU timeslice (i.e., the time allocated for this vCPU to run on the physical processor) expires. During SIE Exit, since the hardware has resources to support only a single vCPU at any given time and it must now load the hypervisor state into the hardware, the millicode saves the current guest state in the state description. While this vCPU is not dispatched, its state is maintained in the state description. Since this state description lies within hypervisor storage, the hypervisor, in such cases, has control of the data for the VM, and in some cases such control is required to interpret instructions being executed on the VM. Existing hypervisors rely on using such an interface through the SIE instruction to dispatch vCPUs.

In the case of secure VMs where the hypervisor is no longer trusted with control of the VM's data, dispatching the secure VM through the same hypervisor interface using the existing SIE instruction is still the preferred (or required in some cases) option for compatibility with existing hypervisors. One or more embodiments of the present invention address such technical challenges by facilitating limited changes to the hypervisor code, so that the same hypervisor infrastructure can be used to dispatch typical non-secure vCPUs as well as the secure vCPUs that prohibit hypervisor data access. One or more embodiments of the present invention facilitate the existing hypervisor to launch the secure vCPUs using the existing SIE instruction by using an improved underlying implementation of SIE instruction in a secure interface control (e.g., millicode) which includes support for dispatching a secure vCPU on the hardware.

In one or more examples, such functionality can be provided by using millicode and/or other hardware modules, and in the present description the hardware modules and the millicode are collectively referred to as a "secure interface control". Accordingly, one or more embodiments of the present invention facilitate the hypervisor to securely and safely use the same SIE interface to dispatch and un-dispatch a secure vCPU that is presently used to dispatch and un-dispatch a non-secure vCPU.

A brief description of background technology now follows, after which, particular features used by one or more embodiments of the present invention for dispatching secure VMs by a hypervisor are described. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
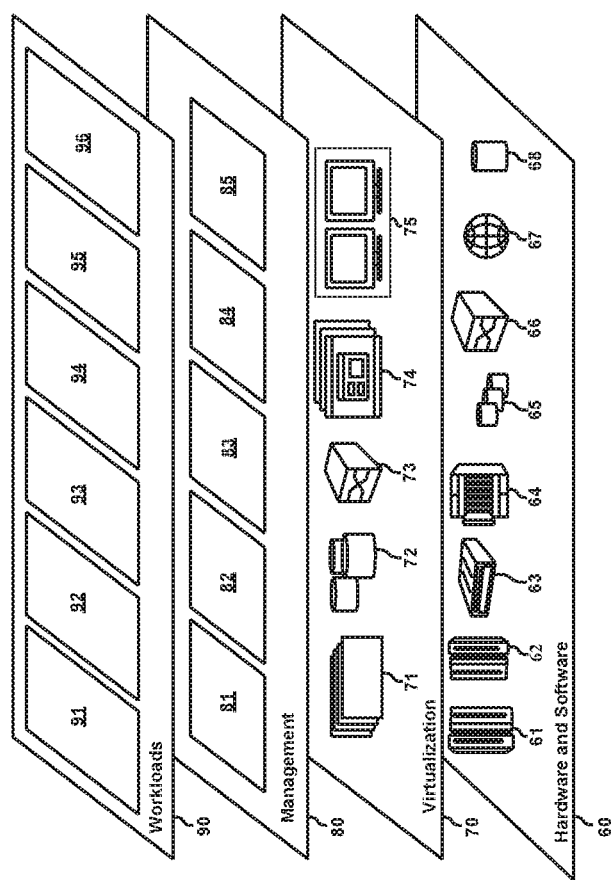
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual machines 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source-code versioning 96. It is understood that these are just some examples and that in other embodiments, the layers can include different services.

Figure 3:
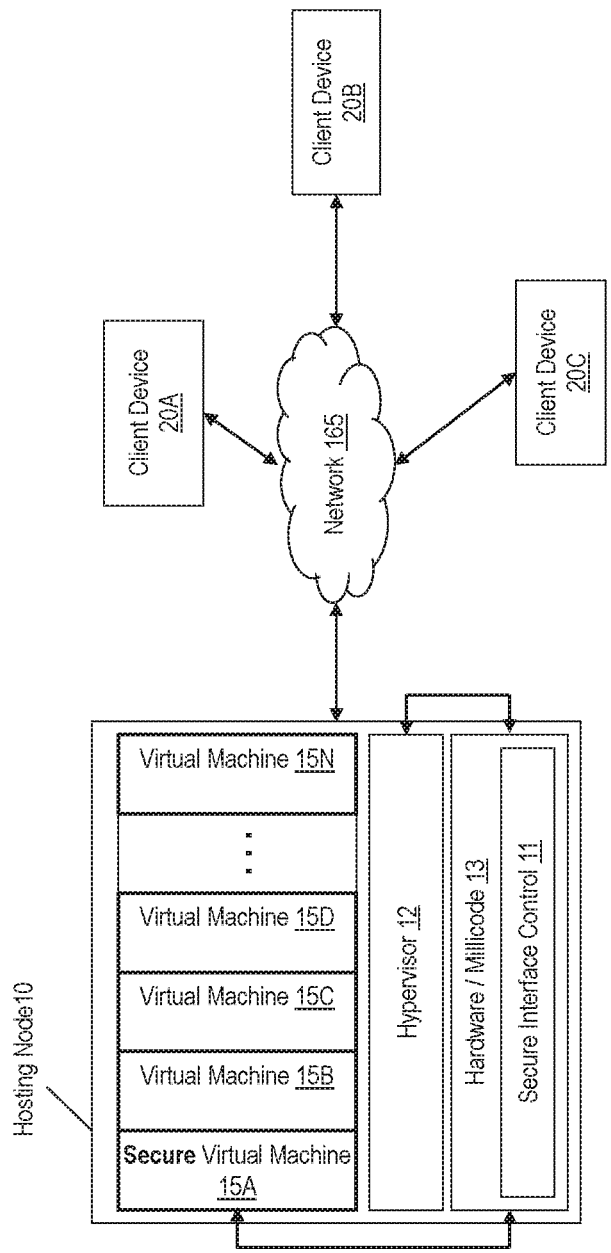
FIG. 3 illustrates a block diagram of a system, according to one or more embodiments of the present invention.

FIG. 3 illustrates an example hosting node 10 according to one or more embodiments of the present invention. The hosting node 10 is in communication with one or more client devices 20A-20C via a network 165. In addition, client devices 20A-20C can have direct communication with hosting node 10. The hosting node 10 can be a datacenter or host server, of a cloud-computing provider. The hosting node 10 executes a hypervisor 12, which facilitates deploying one or more virtual machines 15 (15A-15N). The hosting node 10 further includes a hardware layer or millicode layer 13 that includes a secure interface control 11. The secure interface control 11 includes one or more hardware modules and millicode that facilitates the hypervisor 12 to provide one or more services to the virtual machines 15. In existing technical solutions, there are communications between hypervisor 12 and the secure interface control 11; the secure interface control 11 and one or more VMs 15; the hypervisor 12 and the one or more VMs 15; and the hypervisor 12 to VMs 15 through the secure interface control 11. To facilitate a secure VM environment, the hosting node 10 according to one or more embodiments of the present invention, does not include any direct communications between the hypervisor 12 and the one or more VMs 15.

For example, the hosting node 10 can facilitate a client device 20A to deploy one or more of the virtual machines 15A-15N. The virtual machines 15A-15N may be deployed in response to respective requests from distinct client devices 20A-20C. For example, the virtual machine 15A may be deployed by the client device 20A, the virtual machine 15B may be deployed by the client device 20B, and the virtual machine 15C may be deployed by the client device 20C. The hosting node 10 may also facilitate a client to provision a physical server (without running as a virtual machine). The examples described herein embody the provisioning of resources in the hosting node 10 as part of a 'virtual machine,' however, the technical solutions described can be applied to provision the resources as part of a physical server.

In an example, the client devices 20A-20C may belong to the same entity, such as a person, a business, a government agency, a department within a company, or any other entity, and the hosting node 10 may be operated as a private cloud of the entity. In this case, the hosting node 10 solely hosts virtual machines 15A-15N that are deployed by the client devices 20A-20C that belong to the entity. In another example, the client devices 20A-20C may belong to distinct entities. For example, a first entity may own the client device 20A, while a second entity may own the client device 20B. In this case, the hosting node 10 may be operated as a public cloud that hosts virtual machines from different entities. For example, the virtual machines 15A-15N may be deployed in a shrouded manner in which the virtual machine 15A does not facilitate access to the virtual machine 15B. For example, the hosting node 10 may shroud the virtual machines 15A-15N using an IBM z Systems® Processor Resource/Systems Manager (PR/SM) Logical Partition (LPAR) feature. These features, such as PR/SM LPAR provide isolation between partitions, thus facilitating the hosting node 10 to deploy two or more virtual machines 15A-15N for different entities on the same physical hosting node 10 in different logical partitions.

A client device 20A from the client devices 20A-20C is a communication apparatus such as a computer, a smartphone, a tablet computer, a desktop computer, a laptop computer, a server computer, or any other communication apparatus that requests deployment of a virtual machine by the hypervisor 12 of the hosting node 10. The client device 20A may send a request for receipt by the hypervisor via the network 165 or directly. A virtual machine 15A, from the virtual machines 15A-15N is a virtual machine image that the hypervisor 12 deploys in response to a request from the client device 20A from the client devices 20A-20C. The hypervisor 12 is a virtual machine monitor (VMM), which may be software, firmware, or hardware that creates and runs virtual machines. The hypervisor 12 facilitates the virtual machine 15A to use the hardware components of the hosting node 10 to execute programs and/or store data. With the appropriate features and modifications the hypervisor 12 may be IBM z Systems®, ORACLE VM SERVER™, CITRIX XEN-SERVER™, VMWARE ESX™ MICROSOFT HYPER-V™, or any other hypervisor. The hypervisor 12 may be a native hypervisor executing on the hosting node 10 directly, or a hosted hypervisor executing on another hypervisor.

Figure 4:
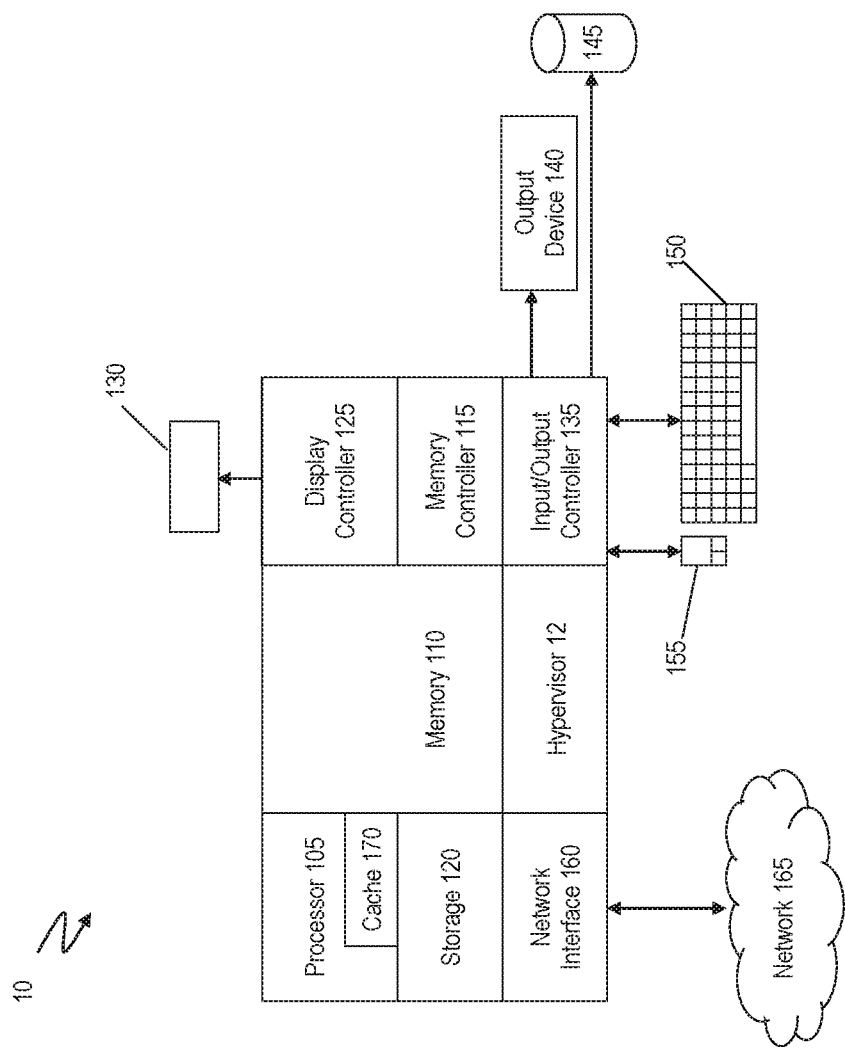
FIG. 4 illustrates a block diagram of a hosting system, according to one or more embodiments of the present invention.

FIG. 4 illustrates components of an example hosting node according to one or more embodiments of the present invention. The hosting node 10 may be a computer, such as a server computer, a desktop computer, a tablet computer, a smartphone, or any other computer that executes the hypervisor 12, which in turn deploys the virtual machines 15A-15N. The hosting node 10 includes components that include hardware, such as electronic circuitry. The hosting node 10 includes, among other components, a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the hosting node 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, flash memory, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS), which executes the hypervisor 12. The operating system may control the execution of other computer programs and provides scheduling, input-output control, file and data management, memory management, and communication control and related services. In an example, such as the z System™, a manufacturer of the hosting node 10 may provide the hypervisor 12. In the case of a system with a structure unlike that of z System, where the hypervisor 12 is not provided by the hardware manufacturer, the cloud computing provided may use a hypervisor 12 such as from VMWARE™, or other hypervisor providers. In an example, the administrator of the physical hosting node 10 is unable to modify the hypervisor 12, except when needed in order to apply service provided by the manufacturer. For example, the hypervisor 12 may be provided as part of a "Licensed Internal Code (LIC)" and/or microcode for the hosting node 10.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The hosting node 10 may further include a display controller 125 coupled to a user interface or display 130. In some embodiments, the display 130 may be an LCD screen. In other embodiments, the display 130 may include a plurality of LED status lights. In some embodiments, the hosting node 10 may further include a network interface 160 for coupling to a network 165. The network 165 may be an IP-based network for communication between the hosting node 10 and an external server, client and the like via a broadband connection. In an embodiment, the network 165 may be a satellite network. The network 165 transmits and receives data between the hosting node 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The client device 20A may request the hypervisor 12 to deploy the corresponding virtual machine 15A with access to specific hardware and/or software components of the hosting node 10. For example, the client device 20A may request that the virtual machine 15A have access to a predetermined number of processors, a predetermined amount of volatile memory (such as random access memory (RAM)), a predetermined amount of non-volatile memory (such as storage space), or any other hardware components. Alternatively or in addition, the client device 20A may request that the virtual machine 15A have access to specific hardware components such as electronic circuitry identified by corresponding unique identifier. For example, the client device 20A may request that the virtual machine 15A have access to a specific type of a processor, a co-processor, a network card, or any other chip or electronic circuitry. In an example, the client device 20A may identify the electronic circuitry using an identifier provided by a manufacturer of the electronic circuitry. In an example, the identifier may be used in conjunction with a version identifier. Alternatively or in addition, the client device 20A may request that the virtual machine 15A have access to specific software components such as an operating system, an application, a basic input/output system (BIOS), a boot image, or any other software component. The software components requested may include firmware and embedded programs in the hardware components of the hosting node 10. The client device 20A may identify the software components requested using respective unique identifiers provided by developers/manufacturers of the respective software components. In an example, the identifiers may be used in conjunction with version identifiers of the software components.

As noted earlier, for a virtual machine 15A to be a secure VM, access to portion(s) of memory 110, storage 120, registers, and any other data associated with the virtual machine 15A by all non-secure guests and the hypervisor 12 is prohibited. In one or more examples, the hypervisor 12 guarantees that for any given resident secure guest page the associated host absolute address is only accessible through a single hypervisor (host) DAT mapping. That is, there is a single host virtual address that maps to any given host absolute address assigned to the secure VM 15A. Further, the hypervisor DAT mapping (host virtual to host absolute) associated with any given secure guest page does not change while it is paged-in. Further yet, the host absolute page associated with any secure guest page is mapped for only a single secure guest. Additionally, there is no sharing of memory/registers between the virtual machines 15, particularly in case of secure VM 15A. Further, in one or more examples, the hypervisor 12 allocates a secure portion of the storage 120 to the secure interface control 11. This secure portion of the storage 120 is accessible by the secure interface control 11 only, once allocated. None of the virtual machines 15 and/or the hypervisor 12 can access contents of the secure portion once it has been allocated to the secure interface control 11.

Any attempted violation to these rules is prohibited by the secure interface control 11 and the hosting node 10, and can raise an alarm. The alarm can be raised by sending a notification to one or more personnel, blocking operation of the hosting node 10, blocking requests from one or more client devices 20, blocking operation of the secure VM 15 (and any other secure VM), and the like.

Figure 5:
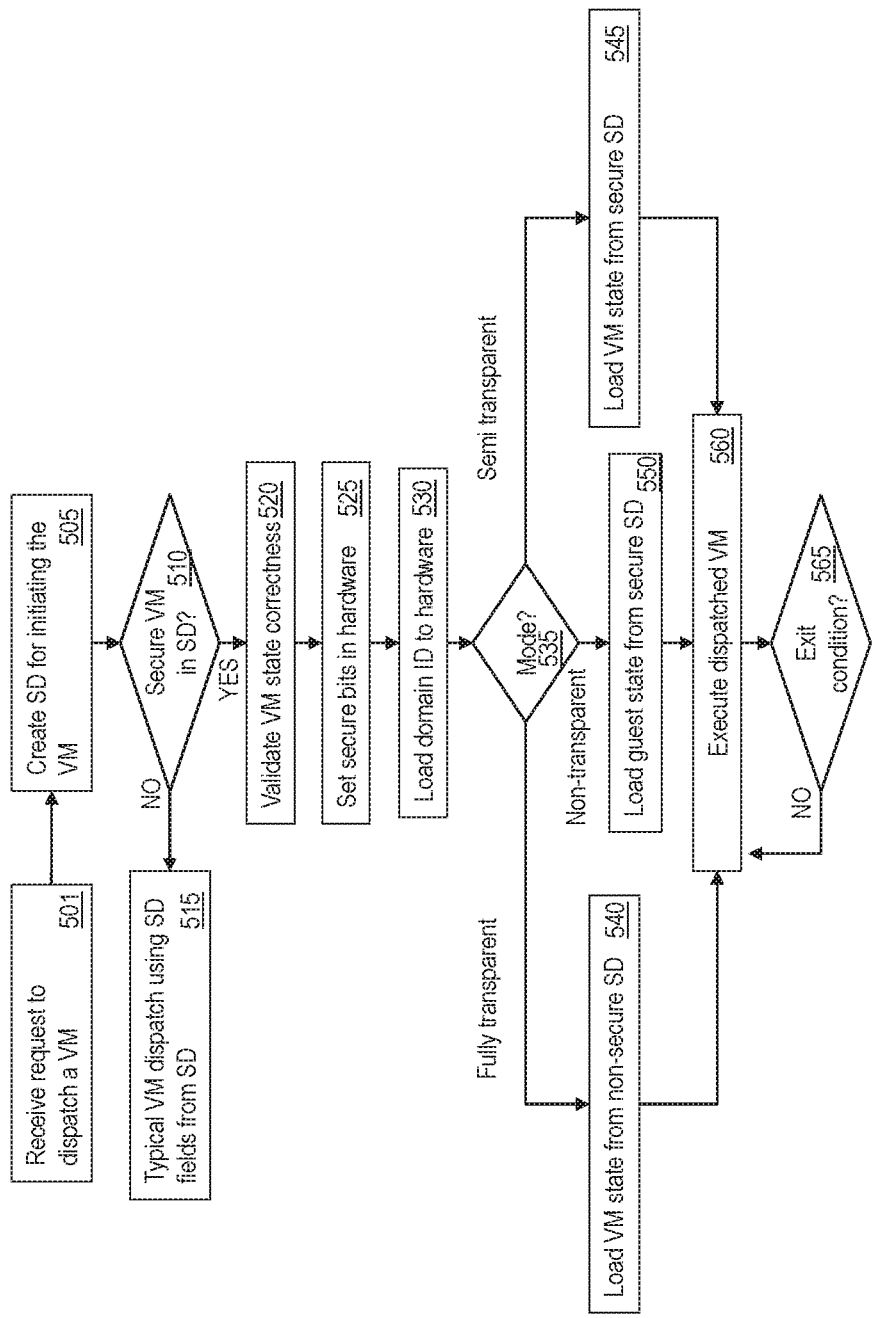
FIG. 5 illustrates a flowchart of an example method for a hypervisor to initiate a secure virtual machine according to one or more embodiments of the present invention.

FIG. 5 illustrates a flowchart of an example method for a hypervisor to initiate a secure VM according to one or more embodiments of the present invention. The method can include receiving a request for initiating the secure VM 15A from a client device 20A, at 501. In one or more examples, the request may be received from any other source, such as another VM 15B-15N, a computer application being executed by the hypervisor 12, an administrator, and the like.

The method includes creating a state descriptor (SD) as an operand of a SIE (Start Interpretive Execution) instruction, at 505. The SD contains fields which define the secure vCPU state to be emulated on the processor(s) 105 allocated to the secure VM, the vCPU state based on the request by the client device 20A. The processors 105 can be considered virtual processors in one or more examples because the processor 105 can be instructed to emulate the behaviour of another processor architecture at the request of the client 20 that initiated the secure VM 15A.

Figure 6:
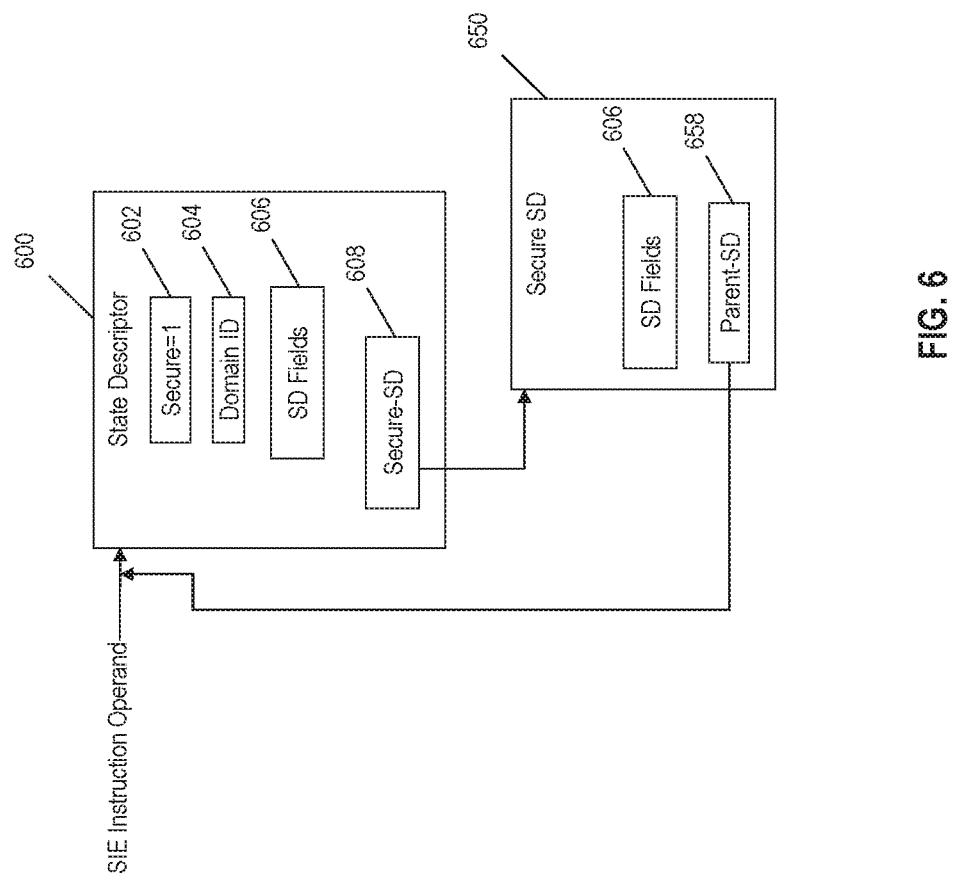
FIG. 6 depicts an example structure of a state descriptor according to one or more embodiments of the present invention.

FIG. 6 depicts an example structure of a SD according to one or more embodiments of the present invention. In one or more examples, the same SD format is used for both, secure and non-secure VMs.

According to one or more embodiments of the present invention, the State Descriptor (SD) 600 includes a mode control field 602 that is used to indicate whether the VM being dispatched is secure or non-secure. The mode control field 602, in one or more examples, can be a bit.

Further, if the mode control field 602 indicates that the SD 600 is for a secure VM, a unique identification designator 604 provides a secure guest domain ID for the particular secure VM 15A that is being dispatched. For a non-secure VM, the unique identification designator 604 is not used, and can include a default value, such as 0 (or any other value that indicates the field is not being used).

Further, the SD 600, referred to here as the parent SD, includes a pointer to a secure-SD block 608. The parent SD and its corresponding secure-SD are called the state-description pair. The pointer to the secure-SD 608 includes a valid value in case of a secure VM, and is set to a null value in case of a non-secure VM being dispatched. The valid pointer to the secure-SD 608 specifies a memory location of a secure-SD block 650. The secure-SD block 650 resides in a portion of secure memory 110 that is assigned to be accessed by the secure interface control 11 only. The secure-SD block 650 includes a pointer 658 back to the parent SD 600. The secure portion of the memory used for the secure SD was donated/allocated to the secure interface control 11 by the hypervisor 12 when it established the secure VM 15A. The secure memory portion can only be accessed by the secure interface control 11, and is not accessible by the hypervisor 12. It may be additionally tagged with the associated guest domain ID. It should be noted that separating the content between secure and non-secure portions of the memory can be performed in a different manner in other examples.

Further, SD 600 includes one or more SD fields 606. In one or more examples, another set of the SD fields 606 is also maintained in the secure-SD 650, in the case where a secure-SD 650 is being used. The SD fields 606 from the secure-SD 650 are accessible only by the secure interface control 11.

Figure 7:
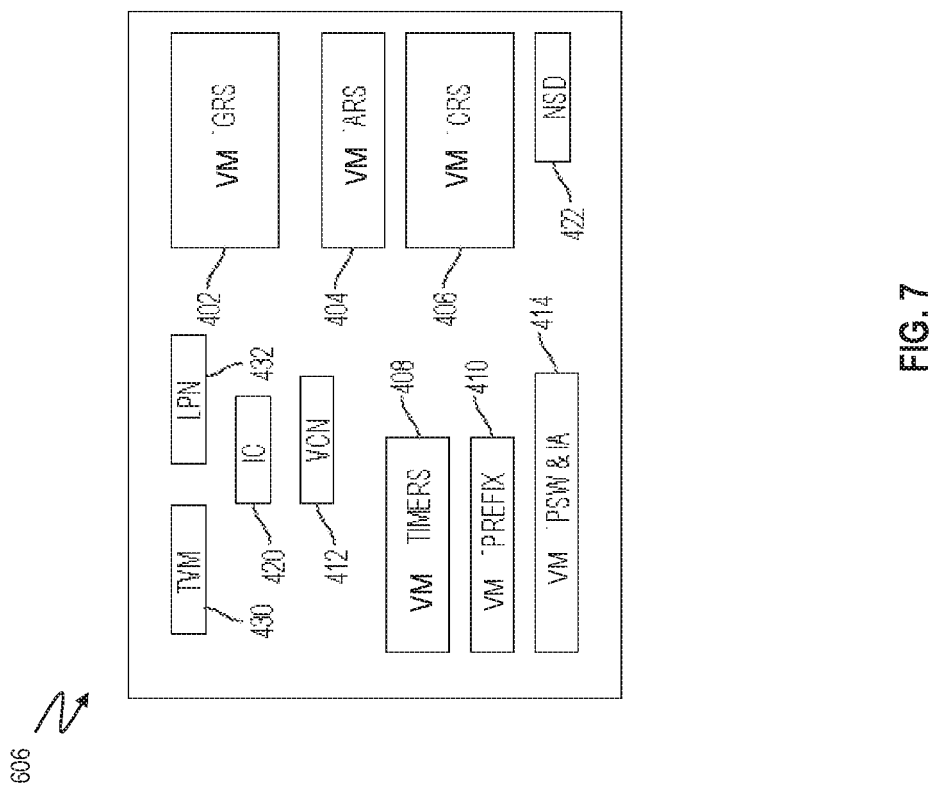
FIG. 7 depicts an example structure of the state descriptor fields according to one or more embodiments of the present invention.

FIG. 7 depicts an example structure of the SD fields according to one or more embodiments of the present invention. In this context, the term "state descriptor" includes not only the state description itself but also the satellite blocks, whose pointers reside in the state description, that act as an extension. As shown in FIG. 7, the SD fields 606 can include the VM general registers (GRs) 402, access registers (ARs) 404, control registers (CRs) 406, VM timers 408 (including clock comparator and CPU timer), VM prefix register 410, logical partition number (LPN) 432, virtual CPU number (VCN) 412, thread validity mask (TVM) 430, program-status word (PSW) and instruction address (IA) 414. In addition, it can include control information such as interception control (IC) bits 420 to indicate if certain instructions (e.g., Load Program Status Word (LPSW) and Invalidate Page Table Entry (IPTE)) require interception to the host. The SD fields 606 shown is exemplary, and can be different in one or more embodiments of the present invention, for example including miscellaneous other fields for other VM states.

Referring back to the flowchart of FIG. 5, the hypervisor 12 issues the SIE instruction with the SD 600 as an operand, with execution of the instruction being done by the secure interface control 11. The SIE (Start interpretive Execution) instruction is used for initiating a VM 15 and allocating processor(s) 105 and other computing resources to the VM 15. The secure interface control 11 determines if the VM to be dispatched is secure based on the mode control field 602 in the SD 600, at 510. If a non-secure VM is to be dispatched, as is presently done, the SD fields 606 from the SD 600 are used to dispatch a non-secure VM 15B at 515. The SIE instruction puts the processor 105 into an emulation state defined in the SD.

Alternatively, if a secure VM is to be dispatched 510, the secure interface control 11 validates the correctness of the secure VM, at 520. This is performed by ensuring the consistency of various values stored in the SD fields 606 between the paired secure-SD 650 and the parent SD 600. In one or more examples, the SD fields 606 contain information (e.g. keys, handles) that is checked for consistency. For example, the secure SD address is obtained from the non-secure, parent SD 600. The parent SD address (658) obtained from the paired secure state description (650) is expected to match the original SIE operand address (i.e., pointer to the non-secure SD 600). Other information like domain ID is also saved in both the secure and non-secure SDs, and can be checked to ensure that the values in both are equal.

In case where a secure VM is being dispatched and the consistency checks between the parent, non-secure SD 600 and the paired secure SD 650 fail the secure VM 15A state is considered invalid, the dispatching is aborted and corresponding notifications, such as audio-visual notifications, messages, and the like (not shown) are sent. In the case where the correctness of the VM state is validated at 520, the secure interface control 11 sets one or more bits in the hardware to configure the computing resources as being allocated to the secure VM 15A in a secure mode, at 525.

Further, the secure guest domain ID 604 is loaded into the hardware and other computing resources to establish a secure execution environment for the secure VM 15A, at 530. There can be different modes of secure execution environments, which typically provide varying limits on the hypervisor's 12 access to the state of the secure VM 15A that is being dispatched. Such modes facilitate debugging a workflow involving the secure VM 15A in one or more examples, although additional applications are also possible in one or more embodiments of the present invention.

For example, consider three debug security modes of operations for the secure execution environment of the secure VM 15A: transparent, semi-transparent, and full transparent modes. Transparent debug mode is used to allow the hypervisor 12 to only view registers of the VM 15, but not secure memory associated with the VM 15. In this mode, the parent, non-secure SD 600 holds the registers for the VM 15, and the secure-SD 650, which would be used for validation (520) in other modes, is not used. In semi-transparent mode, although the registers of the VM 15 are saved in the secure-SD 650, upon interception of an instruction or interruption of the VM 15, the secure interface control 11 determines which register(s) to expose to the hypervisor 12 by copying that register(s) to the non-secure, parent SD 600. In a non-transparent-mode, guest registers are not exposed at all to the hypervisor 12 and are maintained only in the secure-SD 650.

The method (FIG. 5), determines the debug security mode selected based on the secure interface control controls, at 535. The hardware controls that provide these modes of operation are masked by a debug-mask field saved in the secure SD 650, that is, the secure SD 650 has information to indicate which of the three debug modes are allowed. The secure interface control 11 is able to change the debug-mask in the secure SD 650 at runtime when needed. In case the fully transparent mode is selected, the SD fields 606 from the non-secure SD 600 are used to dispatch the VM 15, at 540. In this case, the hypervisor is allowed to access the complete register state of the dispatched VM 15. In case the semi-transparent mode or the non-transparent mode is selected, the secure VM 15A is dispatched using the SD fields 606 from the secure-SD 650, at 545 and 550, respectively. The dispatched VM is then executed 560 until an exit condition is reached 565. The exit condition can include instruction or interruption interpretation, a user request to exit the VM, and the like.

Figure 8:
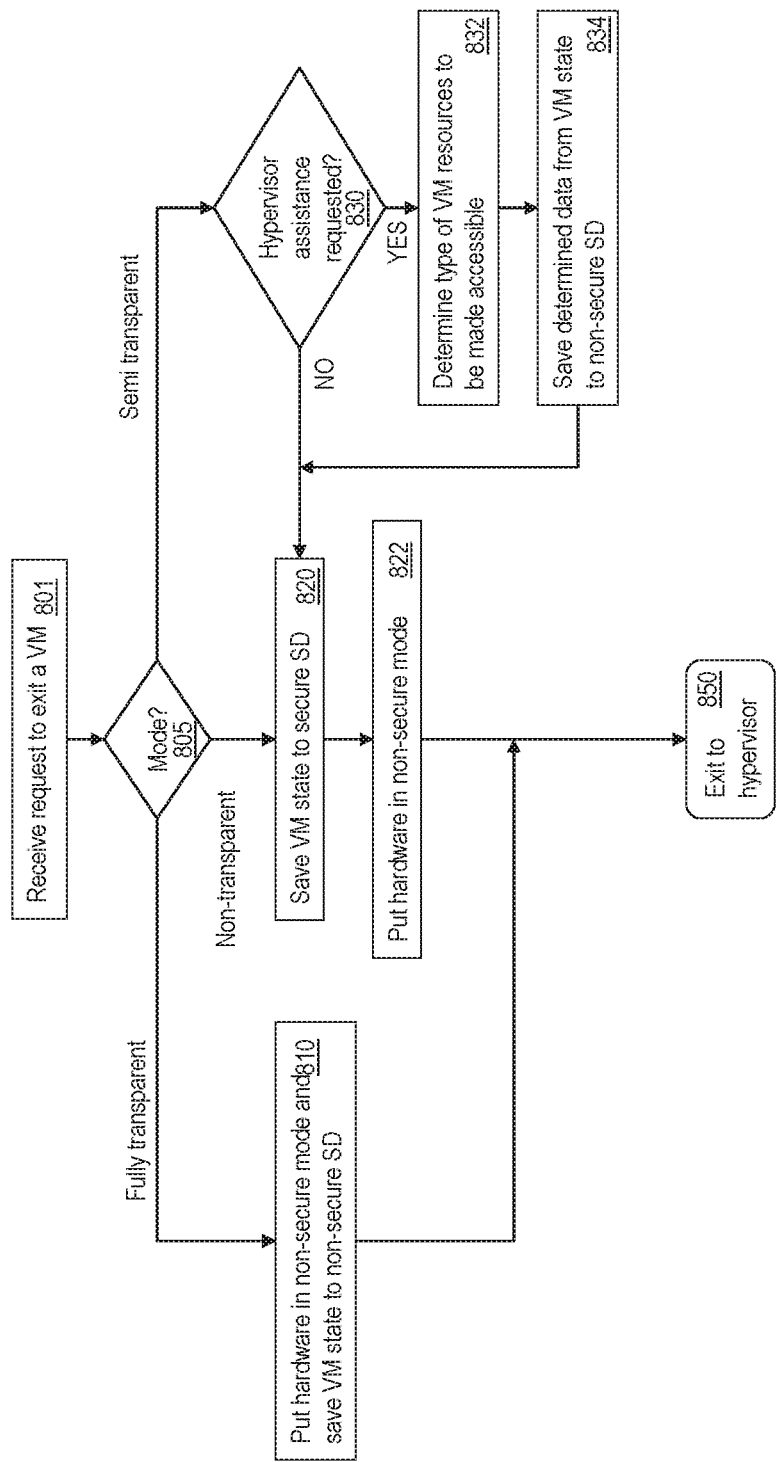
FIG. 8 depicts a flowchart for a method for facilitating exit of a secure virtual machine according to a selected security mode according to one or more embodiments of the present invention.

FIG. 8 depicts a flowchart for a method for facilitating exit of a secure VM according to a selected debug security mode according to one or more embodiments of the present invention. The method initiates upon occurrence of an exit condition of a VM, at 801. The secure interface control 11 checks the debug security mode that was selected for the VM when it was dispatched, at 805.

In case the fully transparent mode was selected 805, the VM state is stored into the SD fields 606 in the non-secure state description 600. That is, the VM is exited similar to a non-secure VM as is done in existing solutions, at 810. The computing resources associated with the VM 15 are configured to be in hypervisor mode by setting one or more parameters of the computing resources 850. The SD fields 606 from the SD 600, resides in the non-secure memory, and is accessible by the hypervisor 12.

In case the non-transparent debug security mode is selected 805, the VM 15 is exited as a secure VM, with hypervisor not being able to access any data/memory or other parameters of the VM state even after the VM has exited. Accordingly, the secure interface control 11 saves the VM state into SD fields 606 in the secure-SD 650 at 820, which resides in the secure portion of the memory 110, and is not accessible by the hypervisor 12. Further, the secure interface control 11 reconfigures the computing resources associated with the VM 15 to operate in non-secure mode, at 822.

In case the semi-transparent debug security mode is selected, the secure interface control 11 determines if hypervisor assistance has been requested for completion of a task associated with the VM 15, at 830. Such an assistance request can be made, for example, when one or more values associated with the VM 15 are to be accessed via the hypervisor 12 for debugging, or any other such task. If hypervisor assistance is requested, the secure interface control 11 determines, at 832, what data associated with the VM 15 is to be made accessible to the hypervisor upon the VM's 15 exit. In one or more examples, the assistance request includes identification of which register(s) from the VM 15 is to be made accessible to the hypervisor 12. Alternatively, or in addition, the assistance request may include identification of any other parameter from the VM state that is to be made accessible to the hypervisor 12 upon the VM's 15 exit.

The secure interface control 11 stores the determined parameters/data from the VM state that are to be made accessible to the hypervisor 12 into the SD fields 606 of the non-secure SD 600, at 834. Accordingly, the stored data is accessible to the hypervisor 12 since the SD 600 resides in non-secure portions of the memory 110. Further, at 820, the secure interface control 11 saves the VM state into the SD fields 606 in the secure-SD 650, which is in the secure portion of the memory 110, and is not accessible by the hypervisor 12. Further, the secure interface control 11 reconfigures the computing resources associated with the VM 15 to operate in non-secure mode, at 822 and loads the hypervisor state back into hardware.

If the hypervisor assistance request is not made (830), the secure interface control 11 saves the VM state into the SD fields 606 in the secure-SD 650, which is not accessible by the hypervisor 12, at 820. Further, the secure interface control 11 reconfigures the computing resources associated with the VM 15 to operate in non-secure mode, at 822.

For all three debug security modes, after saving the VM state, the secure interface control 11 exits to the hypervisor 12 for continuing further operations of the hosting node 10, at 850.

Accordingly, one or more embodiments of the present invention facilitate dispatching and exiting (un-dispatching) VMs as secure VMs or non-secure VMs, and further keeping data secure from being accessed by the hypervisor and/or other VMs in the system.

According to one or more embodiments of the present invention a computer server can host secure VMs that prohibit a hypervisor from accessing memory, registers, and other data associated with the secure VMs, without having to change the hypervisor and/or the secure VM code/architecture to dispatch secure VMs. Instead, according to one or more embodiments of the present invention a secure interface control that includes millicode, facilitates securing data using an improved structure of a state descriptor and secure portion of the storage/memory. In addition, the secure interface control stores data from the VM state based on a debug security mode so that in case one or more parameters are to be made accessible to the hypervisor, the secure interface control (millicode) can do so.

One or more embodiments of the present invention are rooted in computer technology, particularly virtual machine hosting computer servers. Further, one or more embodiments of the present invention facilitate an improvement to the operation of computing technology itself, in particular virtual machine hosting computer servers, by facilitating the computer servers that host VMs to host secure VMs, in which even the hypervisor is prohibited from accessing memory, registers, and other such data associated with the secure VM. In addition, one or more embodiments of the present invention provide significant steps towards the improvements of the VM hosting computing servers by using a secure interface control that includes millicode to facilitate a separation of the secure VM and the hypervisor, and thus maintaining a security of the VMs hosted by the computing server. The secure interface control provides lightweight intermediate operations to facilitate the security, without adding substantial overhead to securing VM state during initialization/exit of VMs as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method comprising:
receiving, by a hypervisor that is executing on a host server, a request to dispatch a virtual machine;
based on a determination that the virtual machine is a secure virtual machine, preventing the hypervisor from directly accessing any data of the secure virtual machine; and
performing by a secure interface control of the host server:
determining a security mode of the virtual machine;
based on the security mode being a first mode, loading a virtual machine state from a first state descriptor for the virtual machine, the first state descriptor stored in a non-secure portion of memory; and based on the security mode being a second mode, loading the virtual machine state from a second state descriptor for the virtual machine, the second state descriptor stored in a secure portion of the memory, and wherein the first state descriptor includes a pointer to the second state descriptor.

2. The computer implemented method of claim 1, wherein the second state descriptor is accessible only by the secure interface control and not accessible to the hypervisor.

3. The computer implemented method of claim 1, wherein the secure interface control determines the security mode of the virtual machine based on one or more secure interface control controls qualified with masks saved in the second state descriptor.

4. The computer implemented method of claim 1, wherein the secure interface control validates the correctness of the virtual machine state by comparing values in the first state descriptor and the second state descriptor.

5. The computer implemented method of claim 1, further comprising:
  detecting an occurrence of an exit condition for the virtual machine; and
  performing, by the secure interface control:
    based on the security mode being the first mode, storing the virtual machine state into the first state descriptor that is stored in the non-secure portion of memory; and
    based on the security mode being the second mode, storing the virtual machine state into the second state descriptor that is stored in the secure portion of the memory.

6. The computer implemented method of claim 5, further comprising:
  based on the security mode being a third mode, storing the virtual machine state into the second state descriptor that is stored in the secure portion of the memory, and storing one or more selected parameters from the virtual machine state into the first state descriptor that is stored in the non-secure portion of memory.

7. The computer implemented method of claim 1, wherein the secure interface control comprises millicode.

8. A system comprising:
  a memory;
  a secure interface control; and
  a processing unit coupled with the memory and the secure interface control, the processing unit configured to execute a hypervisor that hosts a plurality of virtual machines, the hypervisor prohibited from directly accessing any data of a secure virtual machine, and wherein the hypervisor is configured to perform a method to manage initiation and exit of the virtual machines, the method comprising:
    receiving, by the hypervisor, a request to dispatch a virtual machine;
    based on a determination that the virtual machine is a secure virtual machine, preventing the hypervisor from directly accessing any data of the secure virtual machine; and
    performing by the secure interface control:
      determining a security mode of the virtual machine;
      based on the security mode being a first mode, loading a virtual machine state from a first state descriptor for the virtual machine, the first state descriptor stored in a non-secure portion of memory; and
      based on the security mode being a second mode, loading the virtual machine state from a second state descriptor for the virtual machine, the second state descriptor stored in a secure portion of the memory, and wherein the first state descriptor includes a pointer to the second state descriptor.

9. The system of claim 8, wherein the second state descriptor is accessible only by the secure interface control and not accessible to the hypervisor.

10. The system of claim 8, wherein the secure interface control determines the security mode of the virtual machine based on one or more secure interface control controls qualified with masks saved in the second state descriptor.

11. The system of claim 8, wherein the secure interface control validates the virtual machine state by comparing values in the first state descriptor and the second state descriptor.

12. The system of claim 8, wherein the method further comprises:
  detecting an occurrence of an exit condition for the virtual machine; and
  performing by the secure interface control:
    based on the security mode being the first mode, storing the virtual machine state into the first state descriptor that is stored in the non-secure portion of memory; and
    based on the security mode being the second mode, storing the virtual machine state into the second state descriptor that is stored in the secure portion of the memory.

13. The system of claim 12, wherein the method further comprises:
  based on the security mode being a third mode, storing the virtual machine state into the second state descriptor that is stored in the secure portion of the memory, and storing one or more selected parameters from the virtual machine state into the first state descriptor that is stored in the non-secure portion of memory.

14. A computer program product comprising a computer readable storage medium, the computer readable storage medium comprising computer executable instructions, which when executed by a processing unit causes the processing unit to perform a method comprising:
  receiving, by a hypervisor that is executing on a host server, a request to dispatch a virtual machine;
  based on a determination that the virtual machine is a secure virtual machine, preventing the hypervisor from directly accessing any data of the secure virtual machine; and
  performing by a secure interface control of the host server:
    determining a security mode of the virtual machine;
    based on the security mode being a first mode, loading a virtual machine state from a first state descriptor for the virtual machine, the first state descriptor stored in a non-secure portion of memory; and
    based on the security mode being a second mode, loading the virtual machine state from a second state descriptor for the virtual machine, the second state descriptor stored in a secure portion of the memory, and wherein the first state descriptor includes a pointer to the second state descriptor.

15. The computer program product of claim 14, wherein the second state descriptor is accessible only by the secure interface control and not accessible to the hypervisor.

16. The computer program product of claim 14, wherein the method further comprises:
  detecting an occurrence of an exit condition for the virtual machine; and performing by the secure interface control:
  based on the security mode being the first mode, storing the virtual machine state into the first state descriptor that is stored in the non-secure portion of memory; and
  based on the security mode being the second mode, storing the virtual machine state into the second state descriptor that is stored in the secure portion of the memory.

17. The computer program product of claim 16, wherein the method further comprises:
  based on the security mode being a third mode, storing the virtual machine state into the second state descriptor that is stored in the secure portion of the memory, and storing one or more selected parameters from the virtual machine state into the first state descriptor that is stored in the non-secure portion of memory.

18. A computer-implemented method comprising:
  dispatching, by a hypervisor that is executing on a host machine, a secure virtual machine, wherein the hypervisor is prevented from directly accessing any data of the secure virtual machine; and
  based on occurrence of an exit condition for the secure virtual machine, performing, by a secure interface control of the host server:
    determining a security mode of the secure virtual machine;
    based on the security mode being a first mode, storing a virtual machine state of the secure virtual machine into a first state descriptor that is stored in a non-secure portion of memory; and
    based on the security mode being a second mode, storing the virtual machine state into a second state descriptor that is stored in a secure portion of the memory that is not accessible by the hypervisor, and wherein the first state descriptor includes a pointer to the second state descriptor.

19. The computer-implemented method of claim 18, further comprising:
  based on the security mode being a third mode, storing the virtual machine state into the second state descriptor that is stored in the secure portion of the memory, and storing one or more selected parameters from the virtual machine state into the first state descriptor that is stored in the non-secure portion of memory.

20. A system comprising:
  a memory;
  a secure interface control; and
  a processing unit coupled with the memory and the secure interface control, the processing unit configured to execute a hypervisor that hosts a plurality of virtual machines, the hypervisor prohibited from directly accessing any data of a secure virtual machine, and wherein the hypervisor is configured to perform a method to manage initiation and exit of the virtual machines, the method comprising:
    dispatching, by the hypervisor, a secure virtual machine, the hypervisor prevented from directly accessing any data of a secure virtual machine;
    detecting an occurrence of an exit condition for the secure virtual machine; and
    performing by a secure interface control:
      determining a security mode of the secure virtual machine;
      based on the security mode being a first mode, storing a virtual machine state of the secure virtual machine into a first state descriptor that is stored in a non-secure portion of memory; and
      based on the security mode being a second mode, storing the virtual machine state into a second state descriptor that is stored in a secure portion of the memory that is not accessible by the hypervisor, and wherein the first state descriptor includes a pointer to the second state descriptor.

21. The system of claim 20, wherein the method further comprises:
  based on the security mode being a third mode, storing the virtual machine state into the second state descriptor that is stored in the secure portion of the memory, and storing one or more selected parameters from the virtual machine state into the first state descriptor that is stored in the non-secure portion of memory.

22. The system of claim 20, wherein the secure interface control determines the security mode of the secure virtual machine based on one or more secure interface control controls qualified with masks saved in the second state descriptor.

* * * * *